United States Patent [19]

Wesley

[11] 3,871,696
[45] Mar. 18, 1975

[54] DANDELION PICKER TOOL
[76] Inventor: Edwin M. Wesley, 2405 Randolph St. N.E., Washington, D.C. 20018
[22] Filed: Dec. 28, 1973
[21] Appl. No.: 429,113

[52] U.S. Cl.............. 294/50.6, 30/124, 56/327 R, 56/339
[51] Int. Cl......................... A01d 1/00, A01d 45/00
[58] Field of Search.......... 294/19 R, 49, 50.6, 50.7, 294/51; 7/14.4, 14.55; 30/169, 171, 279 A, 124; 56/331, 327 R, 332, 338, 339, 340, 400.05, 400.07, 400.11

[56] References Cited
UNITED STATES PATENTS
| | | | |
|---|---|---|---|
| 1,480,825 | 1/1924 | LeNove | 56/339 |
| 1,730,759 | 10/1929 | Crane | 56/327 R |
| 2,900,780 | 8/1959 | Kaiser | 56/339 |
| 3,449,896 | 6/1969 | Burgess | 56/339 |

FOREIGN PATENTS OR APPLICATIONS
| | | | |
|---|---|---|---|
| 644,928 | 10/1950 | United Kingdom | 56/339 |
| 779,709 | 7/1957 | United Kingdom | 56/339 |

Primary Examiner—James B. Marbert
Assistant Examiner—Johnny D. Cherry
Attorney, Agent, or Firm—Marden S. Gordon

[57] ABSTRACT

A tool intended for the picking of dandelions and including a cylindrical receptacle closed at one end and open at the front end and having a V-shaped notch in the front edge thereof, a razor blade having the sharp edge thereof received along one side or portion of the V-shaped notch in a manner to slice the stem of a dandelion passed therethrough, and a tubular handle having one end bent at an angle about forty-eight degrees and affixed to the receptacle adjacent the V-shaped notch with the handle projecting outwardly and upwardly therefrom such that an individual may pass the receptacle behind a dandelion stem with the notch aligned with the stem and then by pulling the receptacle in a forward direction the dandelion is received in the receptacle and the stem sliced by the razor blade thus eliminating any stooping or bending over to cut the dandelion from the ground.

1 Claim, 4 Drawing Figures

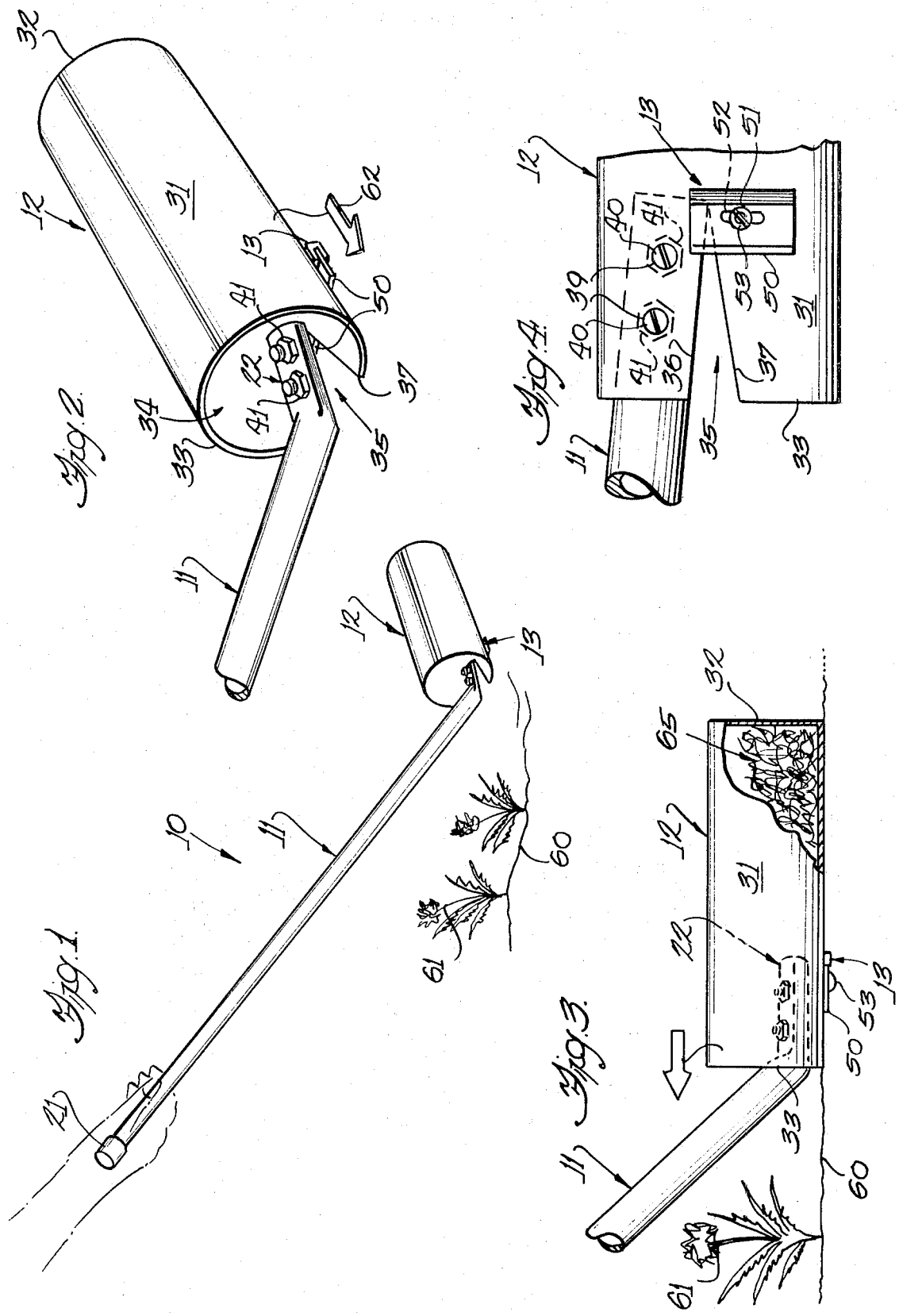

DANDELION PICKER TOOL

BACKGROUND OF THE INVENTION

1. Field of the Invention

This invention relates generally to tools and more particularly to a novel tool for picking dandelions in a manner eliminating stooping and increasing the speed of such picking so that a great number of dandelions may be rapidly picked for use in the making of dandelion wine and the like.

2. Description of the Prior Art

Wines of various types and mixtures are meeting with increased popularity among the populace, with a popular wine being the so-called dandelion wine which is made from a great number of dandelions. The common method presently used for picking dandelions requires that an individual repeatedly stoop or bend over to pull the dandelions from the ground by hand, or alternatively, the individual may use a hand operated clipping device or the like which may be used without having to bend over at the time of the cutting, but the individual must still later bend over when picking the cut dandelions from the ground. Thus, this process is both time consuming and laborious with the same also being very boring to the individual.

SUMMARY OF THE INVENTION

The present invention provides a novel solution for the picking of dandelions in the form of a tool having both a cutting edge and a receptacle associated therewith and which requires no moving parts or the like and yet rapidly slices the stem of dandelions in a manner to catch the dandelion in the receptacle thus permitting the cutting of numerous dandelions in a rapid and expedient manner and the recovery of such cut dandelions all without the individual having to bend or stoop over.

It is a feature of the present invention to provide a novel dandelion picker tool which is devoid of moving parts and which therefore is unlikely to get out of order.

A further feature of the present invention provides a tool for picking dandelions which is relatively simple in its construction and which therefore may be readily manufactured at a relatively low cost and by simple manufacturing methods.

Still a further feature of the present invention provides a tool for picking dandelions which both slices the dandelion stems and catches the cut dandelions in a manner which is easy to use and reliable and efficient in operation.

Yet still a further feature of the present invention provides a tool for picking dandelions wherein the cutting edge thereof may be readily replaced with a new cutting edge in a rapid manner and at an insignificant cost to the individual using the tool.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the tool of the present invention as illustrated in operation;

FIG. 2 is a fragmentary perspective view of the tool;

FIG. 3 is a fragmentary side elevation of the tool having the receptacle thereof partially broken away to illustrate picked dandelions accumulated therein; and FIG. 4 is an enlarged fragmentary bottom plan view of the notch in the tool.

DESCRIPTION OF THE PREFERRED EMBODIMENT

Referring now to the drawings in detail there is illustrated a preferred form of a dandelion picker tool constructed in accordance with the principles of the present invention and designated generally in its entirety by the reference numeral 10 and which is comprised of three component parts, namely a tubular handle 11, a cylindrical receptacle 12, and a single-edged razor blade 13. It is to be understood that the elements of the present invention may be manufactured out of metal, wood, hard rubber, plastic, or any other suitable satisfactory material having the desired characteristics for the elements involved.

The handle 11 is of an elongated hollow tubular configuration measuring approximately four feet long and being of approximately three-quarters of an inch in diameter, the handle having the gripping end thereof covered by a plastic cap 21 or the like to close the hollow interior of the handle with the opposite end of the handle being flattened and bent at an angle of approximately forty-eight degrees with respect to the axis of the handle and designated generally by reference numeral 22. A pair of longitudinally spaced apart apertures are provided in the flattened end portion 22 for use in securing the handle to the receptacle 12 as will be later described.

The receptacle 12 is of a cylindrical configuration having cylindrical side walls 31, a closed circular back end 32, and an open front edge 33 defining a compartment 34 interiorly thereof, the preferred receptacle measuring approximately nine inches long and having a diameter of approximately three inches. A V-shaped notch 35 is formed in edge 33 with the apex thereof projecting inwardly of the receptacle toward back end 32, the notch having side edges 36 and 37 with the mouth opening of the notch at the front edge 33 being approximately three-quarters of an inch. A pair of apertures 39 are disposed along side edge 36 and are adapted to receive therethrough a pair of bolts 40 which pass through associated apertures in the handle flattened end 22 and are secured by nuts 41 thus retaining the handle securely affixed to the receptacle.

The razor blade 13 is of a substantially flat rectangular configuration having a cutting edge 50 and a mounting opening 51 centrally thereof, and there is provided adjacent notch edge 37 a slot 52 adapted to receive a bolt 53 which extends through razor blade opening 51 and the slot and which is affixed therein by a nut to retain the razor blade 13 affixed to the side surface of receptacle 12 with cutting edge 50 projecting into notch 35 across the apex portion thereof in a manner to engage the stem of any dandelion passing through the notch as will be later described. It is to be understood that the slot 52 provides for orientation of the razor blade 13 to move different portions of the cutting edge 50 into the notch 35 so as to use fresh portions of the cutting edge as any particular portion of the cutting edge becomes dulled. Further, it is to be understood that the razor blade may be oriented in any manner relative to the notch, with a further preferred orientation being to have the razor blade cutting edge 50 extending along notch side edge 37 and projecting into the notch 35 and overlapping the apex portion of the notch such that as the stem of a dandelion is drawn into the notch it may be sliced along the cutting edge.

In operation an individual grips the handle 11 in one hand or both hands such that notch 35 is disposed adjacent the ground surface 60 with the individual then aligning the notch with the stem 61 of a dandelion, after which the individual pulls the receptacle in a direction toward the individual, such as designated by arrow 62 in FIG. 2, this engaging the stem of the dandelion in the notch with the cutting edge 50 of razor blade 31 severing the stem such that the dandelion falls into the compartment 34 of the receptacle with the dandelions accumulating therein, such as shown by reference numeral 65 in FIG. 3. In this manner an individual may rapidly and speedily accumulate a great number of dandelions without having to bend or stoop over either to cut the same or to recover the dandelions after they have been cut.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A tool for picking dandelions adapted for use by an individual eliminating any bending or stooping of the individual either in the cutting of the dandelion or the recovery of the cut dandelion from the ground, the tool comprising, in combination:

an elongated tubular handle member having a gripping end at a top end thereof and a flattened end at the opposite bottom end thereof, the flattened end being bent at an angle to the axis of the handle member to assume a substantially horizontal plane with the remainder of the handle member projecting upwardly and outwardly therefrom at an angle thereto;

a cylindrically shaped cap adapted to fit over the gripping end of said handle member to close the top end thereof;

a hollow elongated rigid cylindrical receptacle having cylindrical side wall surfaces, a closed back end, and an open front end;

a compartment defined interiorly of the receptacle and opening out of the front end thereof;

a V-shaped notch defined in a portion of said receptacle side wall surfaces and having the base portion thereof defined in and contiguous to said receptacle open front end with the apex portion thereof projecting inwardly of the receptacle side wall surfaces in the direction of said receptacle back end, said V-shaped notch including inclined side edges tapering from the base to the apex portion thereof;

the flattened end of said handle being aligned with one of said side edges of said slot and disposed adjacent thereto;

a pair of spaced apart apertures disposed in said flattened end;

a pair of similarly aligned and disposed apertures disposed in said receptacle side wall surface adjacent said one side edge of said notch, said apertures of said handle and said receptacle adapted to be placed in alignment with each other;

a bolt associated with each pair of aligned apertures and adapted to pass therethrough;

a nut associated with each terminal end of each bolt and adapted to be threaded thereon to attach said handle to said receptacle with the handle projecting forwardly of the front end of the receptacle;

a single-edged substantially flat razor blade having a cutting edge extending therealong;

an opening provided in said receptacle side wall surfaces adjacent the edge of said notch opposite from the notch edge having the handle secured therealong;

an opening disposed approximately centrally of said razor blade;

the razor blade disposed adjacent the exterior surface of said receptacle side walls with said razor blade opening in alignment with said associated receptacle opening;

a bolt adapted to pass through said aligned openings and be secured therein by a nut to detachably attach said razor blade to said receptacle; and the razor blade being adjustable on said receptacle for various positions of projecting of said razor blade cutting edge into the open region of said V-shaped notch across the apex portion of said notch in a direction substantially normal to the longitudinal axis of said notch and adapted to slice the stems of dandelions as they pass through said notch with the dandelions being accumulated in said receptacle after being sliced by said cutting edge.

* * * * *